United States Patent [19]

Lamprecht et al.

[11] 4,013,373
[45] Mar. 22, 1977

[54] SNAP-RING-CONNECTED COAXIAL ANNULAR MEMBERS

[75] Inventors: Horst Lamprecht, Oberwerrn; Georg Welsch, Grafenrheinfeld, both of Germany

[73] Assignee: Kugelfischer Georg Schäfer & Co., Schweinfurt, Germany

[22] Filed: Sept. 12, 1975

[21] Appl. No.: 612,802

[30] Foreign Application Priority Data

Sept. 13, 1974 Germany ............................ 2443918

[52] U.S. Cl. ............................... 403/291; 220/320; 277/178; 285/321; 285/397; 403/292; 285/DIG. 22

[51] Int. Cl.² ...................... F16D 1/00; F16G 11/00

[58] Field of Search .......... 403/264, 291, 333, 334, 403/404, 405, 406, 292, 276, 220, 223, 381, 189, 230; 220/319, 320; 285/321, DIG. 22, 370, 397; 277/171, 178, 206; 52/758 D, 758 C, 753 E

[56] References Cited

UNITED STATES PATENTS

| 1,228,541 | 6/1917 | Durbin | 285/109 X |
|---|---|---|---|
| 1,772,915 | 8/1930 | Roseberg | 403/223 X |
| 2,871,034 | 1/1959 | Wiltse | 285/109 |
| 2,977,994 | 4/1961 | Xenis | 285/370 X |
| 3,122,383 | 2/1964 | Hirsch | 285/397 |
| 3,228,705 | 1/1966 | Underwood | 277/206 |
| 3,447,819 | 6/1969 | Borsum et al. | 285/321 X |

FOREIGN PATENTS OR APPLICATIONS

| 684,638 | 3/1965 | Italy | 285/397 |

*Primary Examiner*—Wayne L. Shedd
*Attorney, Agent, or Firm*—Karl F. Ross; Herbert Dubno

[57] ABSTRACT

Two annular members, such as a sleeve and an abutment ring, are held together by a snap ring of generally V-shaped (or Y-shaped) cross-sectional profile with a pair of lips with a mirror-symmetrical confronting annular grooves of the members, the arms of the V (or Y) resting against tapering rims of the grooves. The rims and the arms terminate in beveled edges serving, upon the fitting of one lip of the connecting ring into the groove of one member, to cam the other lip radially inwardly for letting it snap into the groove of the other member as the two members are axially pressed together.

10 Claims, 7 Drawing Figures

SNAP-RING-CONNECTED COAXIAL ANNULAR MEMBERS

FIELD OF THE INVENTION

Our present invention relates to a connector for a pair of annular members which are to be assembled in a coaxially juxtaposed position.

BACKGROUND OF THE INVENTION

There are instances in which it is desirable, for simplicity of assembly, to provide a detachable provisional connection between two annular members that are to be fixedly juxtaposed in coaxial relationship upon final mounting. Such a provisional joint is not subjected to any stresses in use but must withstand a certain amount of handling in the course of emplacement. Members so interconnected may comprise, for example, a sleeve serving as a journal-bearing race and an adjoining abutment ring of larger outer diameter forming a shoulder.

It has already been proposed (see, for example, German utility-model registration No. 1,988,421) to interconnect two axially juxtaposed bearing races by an annular clip with a U-shaped cross-sectional profile whose arms engage in annular grooves of the two members. Such a clip, made of sheet metal, is expensive to manufacture and difficult to attach automatically to the associated members. Its peripheral discontinuity precludes an accurate self-centering and there is no simple way of fitting it onto the members in such a way as to eliminate any axial play therebetween. Once the sleeves have been permanently mounted on a shaft, their axial separation for the purpose of inspection or repair is impossible without destruction of the clip.

OBJECTS OF THE INVENTION

The general object of our present invention, therefore, is to provide an improved connector for the purpose described which is inexpensive to manufacture, easy to install and capable of automatically aligning the associated members with itself and with each other.

Another object is to provide a connector of this character which enables the two joined members to be nondestructively separated and reconnected an indefinite number of times.

SUMMARY OF THE INVENTION

These objects are realized, in accordance with our present invention, by the provision of a connector in the form of an elastically deformable continuous ring, preferably of thermoplastic material reinforced by glass fibers or the like, which has a double-frustoconical outer peripheral surface diverging from a midplane, defining a pair of lips receivable in a pair of substantially complementary inner peripheral grooves on the confronting faces of the two annular members to be interconnected thereby. These grooves have tapering rims against which the outer ring surface comes to rest after the lips have snapped into them, the combined depth of the two grooves being preferably greater than the axial width of the ring whereby the groove bottoms remain axially spaced from the ring faces to facilitate the deformation of the ring necessary for axial separation and re-engagement. Advantageously, the ring and the two members are provided with beveled outer and inner peripheral edges, respectively, which cammingly co-operate to deform the lips of the ring generally radially during assembly.

Such a ring may have a generally V-shaped or Y-shaped cross-sectional profile with two substantially symmetrical, outwardly diverging arms externally bounded by the generatrices of its double-frustoconical surfaces, these generatrices preferably including an angle between substantially 15° and 45° with the direction of the ring axis. It is these frustoconical surfaces, rather than the end faces of the ring, which center the ring relatively to the adjoining members by its coaction with the complementarily tapering groove walls.

BRIEF DESCRIPTION OF THE DRAWING

The above and other features of our invention will now be described in detail with reference to the accompanying drawing in which.

SPECIFIC DESCRIPTION

As illustrated in FIGS. 1, 2, 6 and 7, an assembly according to our invention comprises two coaxially juxtaposed annular members 10 and 20 interconnected by an elastically deformable snap ring 30 preferably of polymeric material, e.g. glass-fiber-reinforced polyamide which can withstand operating temperatures of up to about 150° C. For higher temperatures the ring may be made of metal such as spring steel.

Member 10 is a sleeve which may be fitted onto a nonillustrated shaft to serve as the inner race of a ball-type or roller-type journal bearing or as a support for such a race. Member 20, to be mounted on the same shaft, is an abutment ring forming a shoulder or flange which could be used, for example, as part of a thrust bearing combined with the journal bearing.

Figure 5:
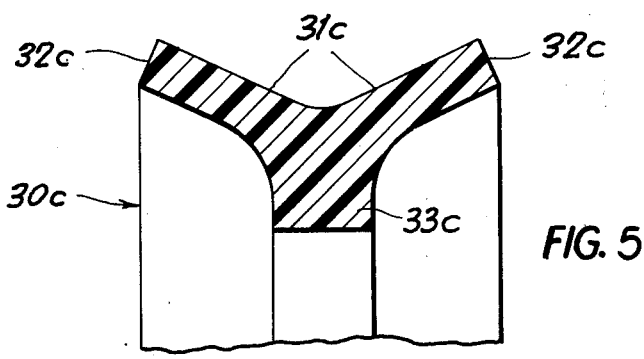

Each of these members, as best seen in FIG. 5, is formed with an inner peripheral groove 13, 23 having a bottom 14, 24, a peripheral wall 11, 21 in the shape of a tapering rim converging away from the groove bottom, and an oppositely beveled peripheral edge 12, 22.

Ring 30, which in this instance has a generally V-shaped cross-sectional profile, has a double-frustoconical outer surface 31 which has its smallest diameter in a midplane perpendicular to the ring axis and whose generatrices are the outer boundary lines of a pair of lips formed by the two arms of the V. The end faces of ring 30 have beveled peripheral edges 32 of substantially the same slope as the edges 12 and 22 of members 10 and 20 i.e. generally transverse to surface 31. As will be apparent from FIG. 1, the groove bottoms 14 and 24 are axially separated by a distance greater than the axial thickness of ring 30 so as to leave clearances between themselves and the ring faces.

Figure 1:
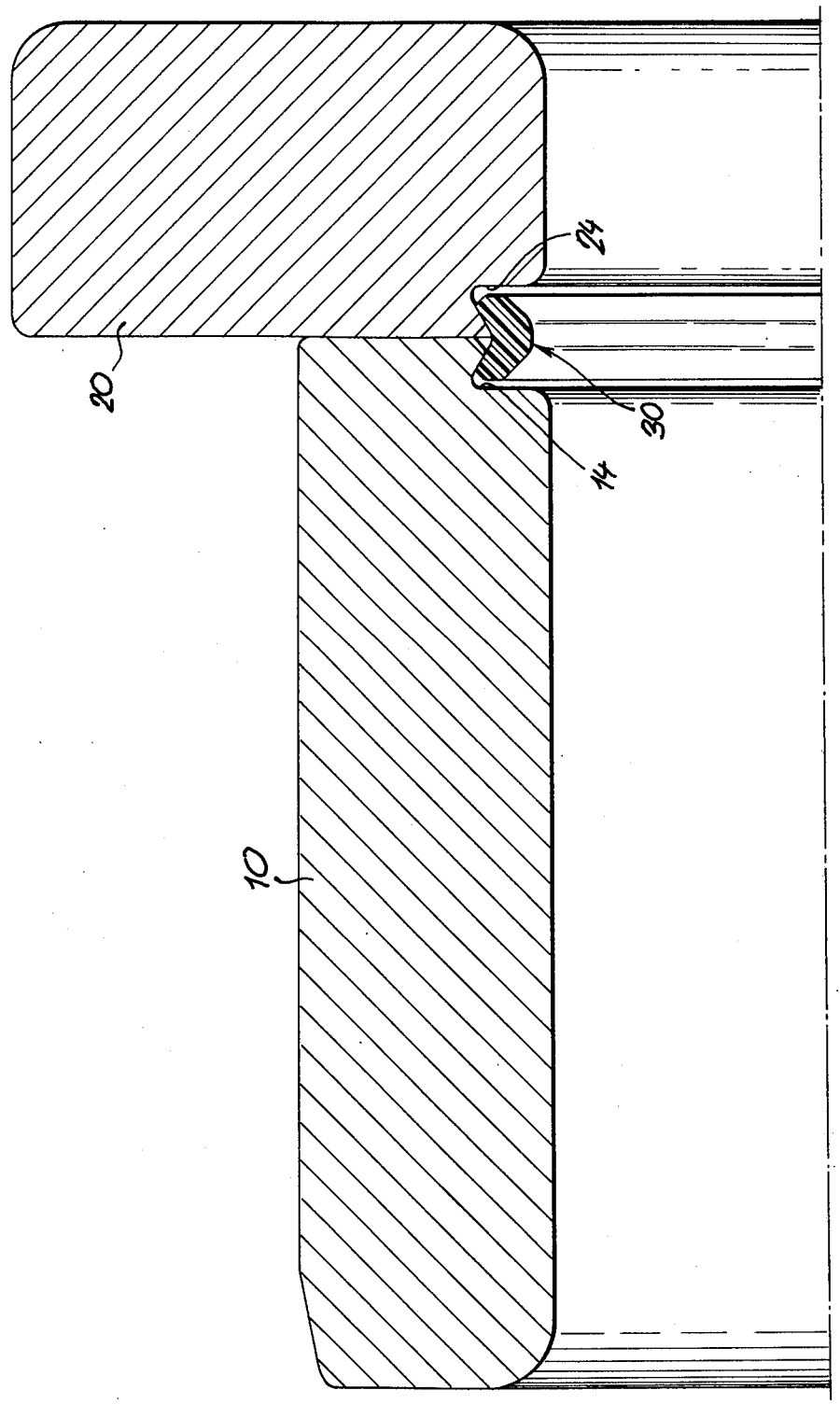
FIG. 1 is a half-sectional view of an assembly of two annular members and a connecting ring according to our invention.
Figure 7:
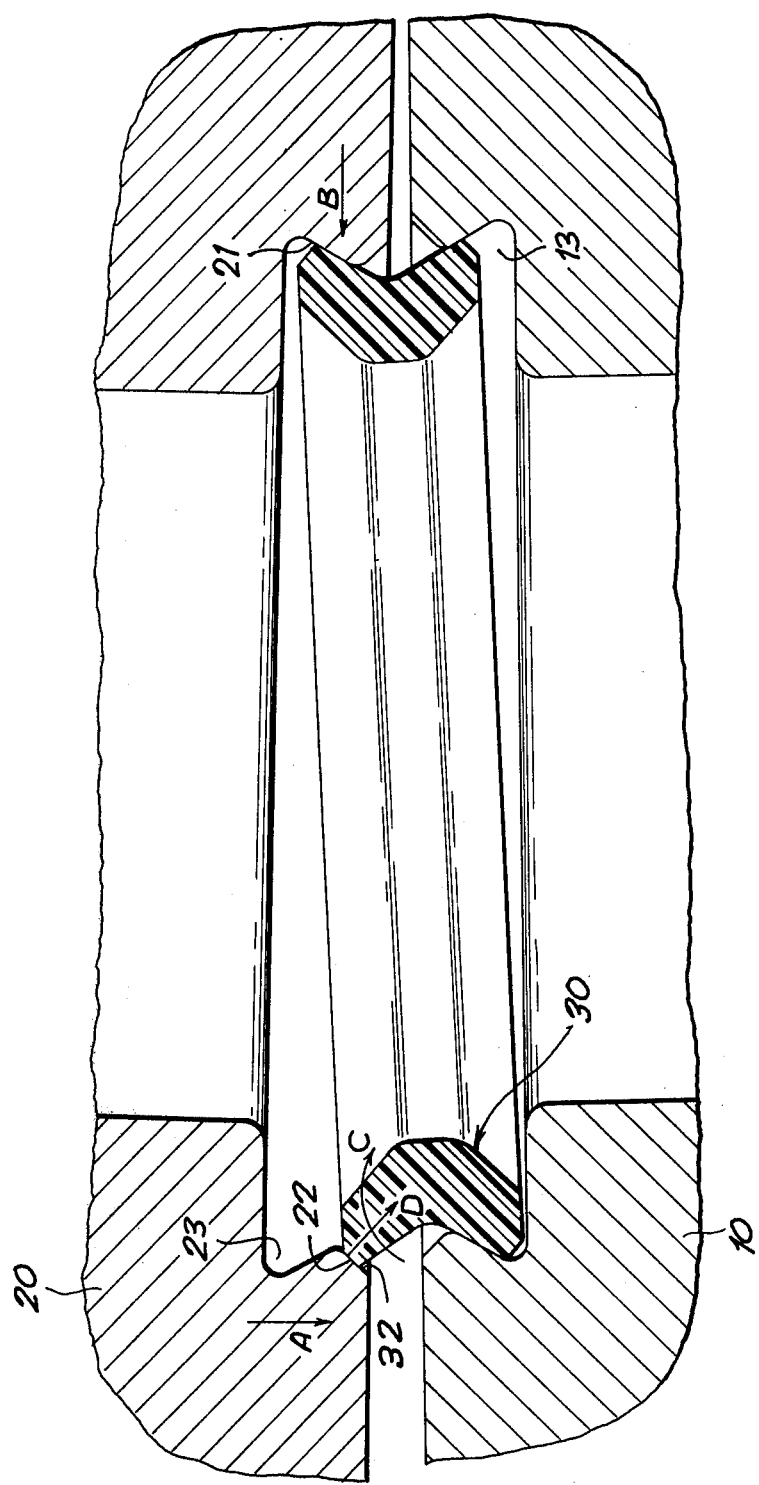
FIG. 7 is a cross-sectional view of the elements of FIG. 1 during assembly.

As illustrated in FIG. 7, elements 10, 20 and 30 can be assembled by first inserting the lower lip of ring 30 into the groove 13 of member 10, partly introducing the upper lip into the corresponding groove 23 of member 20, and thereupon exerting an axial pressure (arrow A) upon member 20 whereby the two beveled edges 22 and 32 cammingly interact along the not yet inserted part of the latter lip, at a location diametrically opposite the region where that lip contacts the groove rim 21 (arrow B). The resulting camming action deforms the left-hand portion of the upper lip as viewed in FIG. 7, causing it to flex inwardly and allow the two transverse faces of members 10 and 20 to come together as the re-expanding lip snaps fully into the groove 23. In this assembled condition, as shown in FIG. 1, the frustoconical groove and ring surfaces 11, 21, 31 alone coact to hold the elements 10, 20 and 30 centered on a common axis.

In view of the slight separation of the groove bottoms from the ring faces, the ring 30 does not experience any axial compression in the assembled position and does not exert upon members 10 and 20 any force tending to separate them. These clearances also permit an overall radially inward deformation of one or both lips when it is desired to separate the members 10 and 20 in an axial direction after they have been mounted on their common shaft. Such a separation, e.g. to facilitate disassembly of the associated bearing for inspection, replacement or repair of some of its rotating bodies, can be readily reversed by an axial thrust in the opposite direction. We have found that repeated separations and re-engagements can be carried out without significantly impairing the cohesiveness of the assembled unit.

Figure 2:
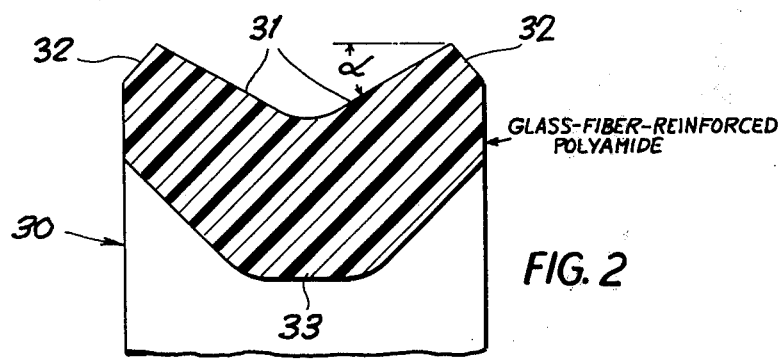
FIG. 2 is an enlarged view of the cross-sectional profile of the connecting ring of FIG. 1.

As indicated in FIG. 2, the angle α included between the outer surface 31 of the arms of the V and a line parallel to the ring axis does not exceed 45° and is preferably no less than about 15°. At the vertex 33 of the V the ring is somewhat heavier than in the vicinity of its end faces. This kind of profile, in which arms symmetrically diverge from a midplane M (FIG. 4) with progressively decreasing thickness, is particularly desirable since it combines a high resistance against axial forces with considerable flexibility in response to torques tending to twist the ring profile about its centroid, i.e. (arrow C) to deform its lips for the purpose of interengagement and separation. It should be noted, though, that axial disengagement and re-engagement without relative tilting (in the presence of a shaft) requires considerably more force than the interfitting operation illustrated in FIG. 7.

Figure 3:
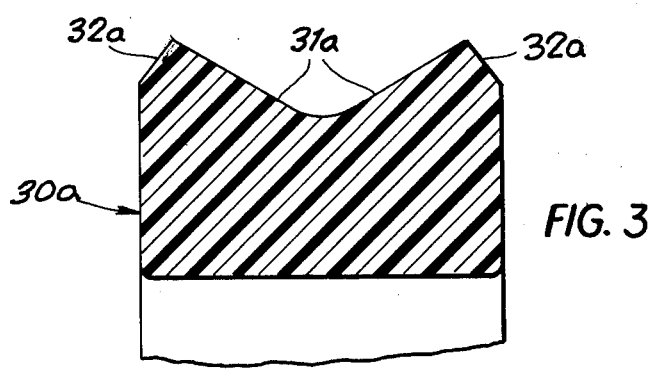
Figure 6:
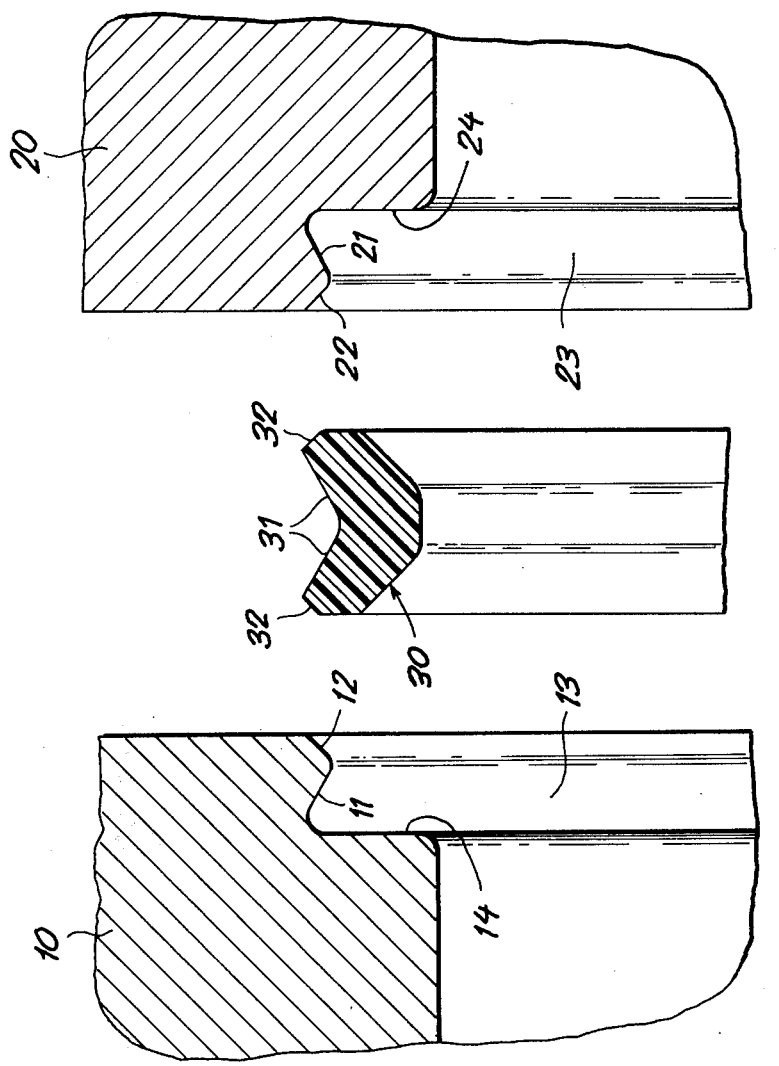
FIG. 6 is a fragmentary axial sectional view of the elements of FIG. 1 in a disassembled state.

The resistance to compression in a direction perpendicular to the camming surfaces (arrow D) can be increased by modifying the connecting ring as shown at 30a (FIG. 3) to give it a cylindrical inner peripheral surface, its arms thus increasing in thickness toward the beveled annular edges 32a which are generally transverse to the frustoconical surface 31a.

Figure 4:
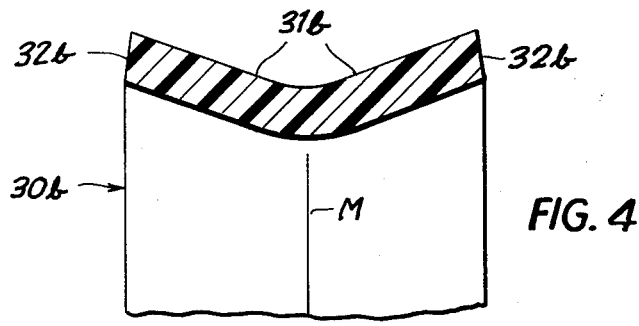
FIGS. 3 – 5 are views similar to FIG. 2, showing alternate ring profiles.

FIG. 4 shows a ring 30b with a V-profile generally similar to that of ring 30 except that the arms are of constant thickness and the beveled edges 32b generally transverse to surface 31b extend fully across these arms. FIGS. 5 shows a ring 30c which resembles ring 30b of FIG. 4 but has a Y-profile with arms of constant thickness, beveled edges 32c generally transverse to surface 31c and a stem 33c. In all these instances, the inner diameter of the ring is at least equal to that of members 10 and 20 so that the ring will not interfere with the insertion of the aforementioned shaft.

A profile as shown in FIG. 4 would be especially suitable for a snap ring made of sheet metal.

We claim:

1. A connector for axially joining two annular members, comprising an elastically deformable continuous ring with a substantially double-frustoconical outer surface having its smallest diameter in a midplane perpendicular to the ring axis, said ring having end faces with radially outwardly converging beveled annular edges generally transverse to said frustoconical surface.

2. A connector as defined in claim 1 wherein said ring consists of thermoplastic material.

3. A connector as defined in claim 2 wherein said thermoplastic material is a glass-fiber-reinforced polyamide.

4. A connector as defined in claim 1 wherein said outer surface has generatrices which include with the axis of said ring an angle between substantially 15° and 45°.

5. In combination, a pair of coaxial annular members and an elastically deformable continuous connecting ring detachably holding said members together, said members being provided along adjoining faces thereof with confronting inner peripheral grooves bounded by tapering rims, the generatrices of each rim converging in a direction away from the respective groove bottom, said ring having an outer peripheral suface of double-frustoconical configuration defining a pair of lips diverging from a midplane at an angle equaling the angle of convergence of said rims, said lips being matingly received in said grooves with said outer peripheral surface resting against said rim.

6. The combination defined in claim 5 wherein said ring has end faces axially spaced from the bottoms of said grooves.

7. The combination defined in claim 6 wherein said ring is provided at said end faces with a pair of beveled outer annular edges and said members are provided at said rims with complementarily beveled inner peripheral edges facilitating interfitting of said members and said lips.

8. The combination defined in claim 5 wherein said ring has a cross-sectional profile with two substantially symmetrical outwardly diverging arms externally bounded by the generatrices of said double-frustoconical surface.

9. The combination defined in claim 8 wherein the generatrices of said double-frustoconical surface include an angle between substantially 15° and 45° with the common axis of said members and said ring, said arms progressively decreasing in thickness from said midplane outwardly.

10. The combination defined in claim 5 wherein said ring has an inner diameter at least equal to that of said members.

* * * * *